United States Patent [19]

Malzkorn

[11] Patent Number: 4,638,550
[45] Date of Patent: Jan. 27, 1987

[54] HORIZONTAL DRILLING AND MILLING MACHINE

[75] Inventor: Matthias Malzkorn, Jüchen, Fed. Rep. of Germany

[73] Assignee: Scharmann GmbH & Co., Mönchengladbach, Fed. Rep. of Germany

[21] Appl. No.: 533,252

[22] Filed: Sep. 16, 1983

[30] Foreign Application Priority Data

Sep. 17, 1982 [DE] Fed. Rep. of Germany ....... 3234498

[51] Int. Cl.⁴ .......................................... B23Q 3/157
[52] U.S. Cl. .................................... 29/568; 409/144; 409/201; 409/215; 409/216; 409/230
[58] Field of Search ................... 29/568, 26 A, 426.3, 29/40, 42; 414/736; 409/144, 201, 209, 215, 217, 230, 216

[56] References Cited

U.S. PATENT DOCUMENTS

| 3,037,429 | 6/1962 | Schurger | 409/215 |
| 3,460,435 | 8/1969 | Hucks et al. | 409/230 X |
| 3,483,796 | 12/1969 | Galbarini et al. | 409/216 |
| 3,757,637 | 9/1973 | Eich et al. | 409/230 |
| 4,050,146 | 9/1977 | Geiger | 29/568 |
| 4,121,332 | 10/1978 | Corsi | 29/568 |

FOREIGN PATENT DOCUMENTS 1225945 9/1966 Fed. Rep. of Germany .
2528677 1/1976 Fed. Rep. of Germany .

*Primary Examiner*—Z. R. Bilinsky
*Attorney, Agent, or Firm*—Becker & Becker, Inc.

[57] ABSTRACT

A horizontal drilling and milling machine having a horizontal, rotatable work table and an angle-cutting milling head with a milling spindle and a drive shaft which is driven by the drilling spindle of the headstock. The milling head is rotatable about the axis of the drilling spindle, and can be pivoted into a tool exchanging position about an axis which extends at right angles to the axis of the drilling spindle.

12 Claims, 5 Drawing Figures

HORIZONTAL DRILLING AND MILLING MACHINE

BACKGROUND OF THE INVENTION

1. Field of the Invention

The present invention relates to a horizontal drilling and milling machine which has a horizontal, rotatable work table, and an angle-cutting milling head with a milling spindle and a drive shaft which is driven by the drilling spindle of the headstock.

2. Description of the Prior Art

When machining workpieces with a horizontal drilling and milling machine, the need exists for being able to machine the workpiece on five sides without having to unclamp, move, and reclamp the workpiece on the rotary table; in this connection, the tool can be placed in any desired position relative to the workpiece. In German Auslegeschrift No. 1 225 945, requirement is met by a pivotable work table for the workpieces. With this heretofore known milling machine, a wedge-shaped base is provided, on the incined upper slde of which a pivotable part is rotatably mounted which in turn again carries a work table that is rotatable about a second axis of rotation. German Offenlegungsschrift No. 25 28 677 discloses a machine tool according to which the rotary table which supports the workpiece is arranged on a bracket that can be adjusted not only in the longitudinal direction but also in the transverse direction, and can be tilted about a longitudinal axis.

Both of the aforementioned machines require that the rotary table and its support be embodied in such a way that the workpiece which is clamped thereon can be brought into all positions in which the tool can be applied to the workpiece at the desired angle.

In contrast, an object of the present invention is to provide a milling machine of the aforementioned general type according to which even the most difficult workpieces, without having to be reclamped and tilted, can be machined on five sides at all angles of application of the tool. Furthermore, exchange of the tool is to be effected automatically, with the structural arrangement of the machine being simple, and its adjustment being easy.

BRIEF DESCRIPTION OF THE DRAWINGS

These objects, and other obJects and advantages of the present invention, will appear more clearly from the following specification in conjunction with the accompanying drawings, in which.

SUMMARY OF THE INVENTION

The milling machine of the present invention is characterized primarily in that the angle-cutting milling head can be rotated about the drilling spindle axis, and can be pivoted into a tool exchanging position about an axis which is at right angles to the drilling spindle axis.

Pursuant to specific embodiments of the present invention, which represent improvements and further developments of the features of the present invention, the angle-cutting milling head may be held by a holder of a rotatable partial disk on the headstock or a part thereof. The partial disk may be driven by a motor on the head stock, and can be fixed in position bv a hydraulically releasable spring device.

The drilling spindle may be axially displaceable, and may be adapted to be uncoupled from the coaxial drive shaft of the milling head.

The milling head, by means of lateral pins, may be pivotably supported on the holder which is connected with the partial disk; one of the pins may carry a pinion which is driven by a motor which is parallel to the drilling spindle.

The headstock, or a part connected therewith, may support a tool ejector which is located behind the milling head when the latter is located in its tool exchanging position.

The inventive milling machine may have associated along the side thereof a continuous tool storage that is provided with a tool changing arm, the length of which corresponds to the distance of the storage from the milling head when the latter is in its vertica exchanging position.

To adjust every desired angular position of the milling head, the partial disk may be driven by a digitally controlled planetary gearing.

The milling machine of the present invention offers the advantage that it only requires a straight-forward rotatable tabe, the support of which needs only to provide the tabe with the possibility of rotating about a vertical axis. This assures a simple construction of the part of the machine which even supports the most difficult workpieces. To move the workpiece itself, no great expenditure of energy is required, since to change the engagement or application of the tool on the workpiece, it is not necessary to move a large mass in the form of the heavy tabe. and the somewhat heavy workpiece disposed thereon, in three planes. Rather, only the partial disk and the angle-cutting milling head need to be moved, while the table with the workpiece thereon undergoes a rotation, as known, in a horizontal plane.

DESCRIPTION OF PREFERRED EMBODIMENTS

Figure 2:
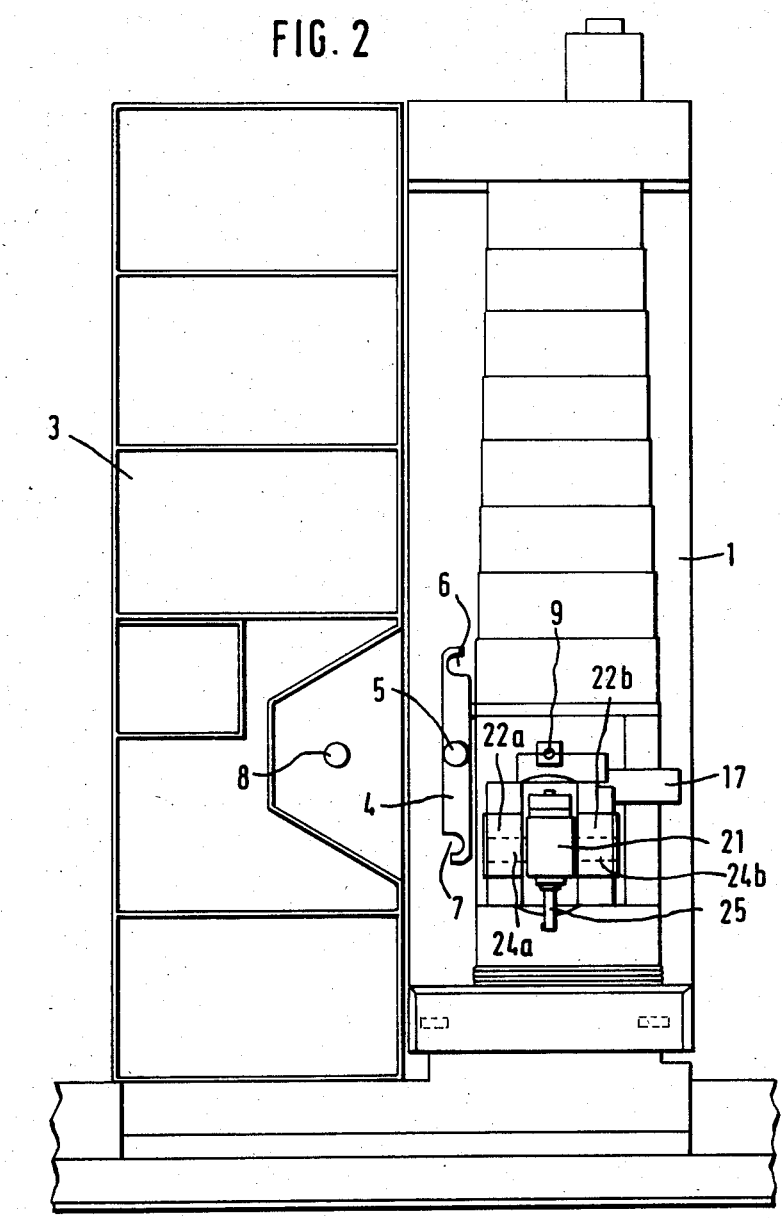
FIG. 2 is a front view of the inventive machine showing the headstock and the milling head disposed thereon.

Referring now to the drawings in detail, the inventive horizontal drilling and milling machine is equipped at A with a non-illustrated round or work table for a workpiece. The arrangement and configuration of this table, which can be rotated in a horizontal plane about a vertical axis, and onto which the workpiece can be clamped, are known to one skilled in the art. Furthermore, the machine is equipped with the column 1, which can also be adjusted in a horizontal plane in the longitudinal and transverse directions. A headstock 2 can be moved vertically up and down along the column 1. As shown in FIG. 2, a vertical tool storage 3 is arranged next to the column 1. A two-armed changing arm 4 is arranged between the tool storage 3 and the column 1 for exchanging the tools. The changing arm 4 can be rotated about a shaft 5, and is provided at its ends with the tool receiving recesses 6, 7. The ends of the two-armed changing arm 4 can bring a tool out of the position 8 at the tool storage 3 into the position 9 on the angle-cutting milling head 21 (which will be described subsequently in greater detail), and vice versa. This tool exchanging device is known.

Figure 3:
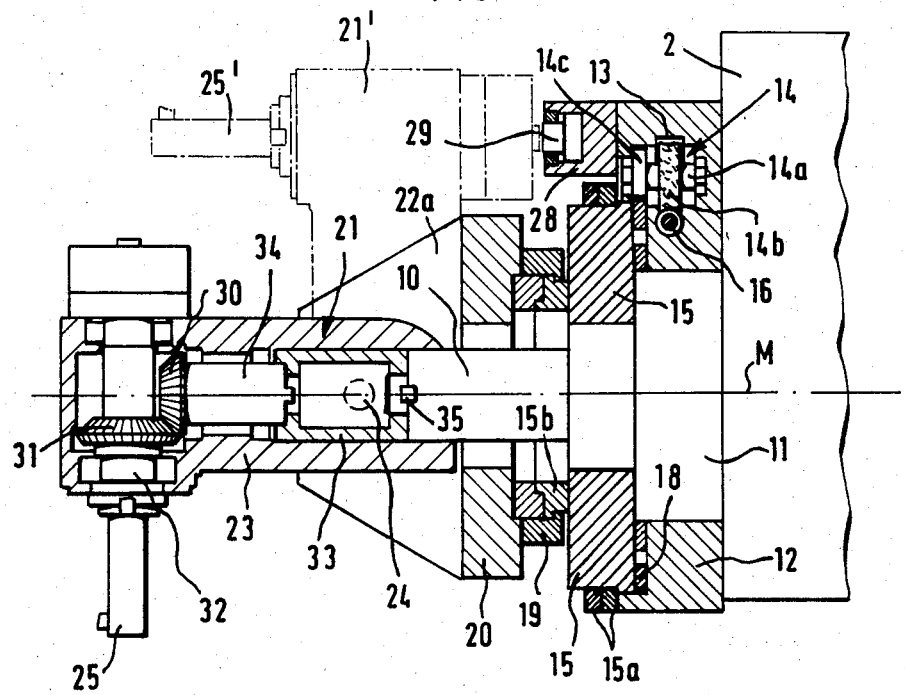
FIG. 3 is a vertical section through the headstock, the pivotable milling head, and the parts which are disposed therebetween.

As shown in FIG. 3, the drilling spindle 10 can be axially extended and retracted from the headstock 2. The spindle 10, or its bearing part 11, is surrounded by a ring 12 which is connected to the headstock 2. In the recess 13 of the ring 12, there is are the gearing 14 for the drive of a partial disk 15 which is rotatable in a vertical plane. The partial disk 15 is rotatably held on the ring 12 by means of retainer rings 15a. The gearing 14, which includes the shaft 14a and the two pinions 14b and 14c is driven by a shaft 16 of a side motor 17 which is arranged on the headstock 2 or on the ring 12.

At the level of the pinion 14c of the gearing 14, the partial disk 15, on that side which faces the ring 12, is provided with a gear ring 18 in which the pinion 14c meshes. The partial disk 15, which is able to rotate in a vertical plane about the axis M of the drilling spindle 10, is rotatable on the ring 12 with the aid of the retainer 15a, and can be held in place in a position achieved at any given time via spring means. For rotating the partial disk 15, this position can be released hydraulically or in any other manner that is customary in the machine tool art.

Figure 1:
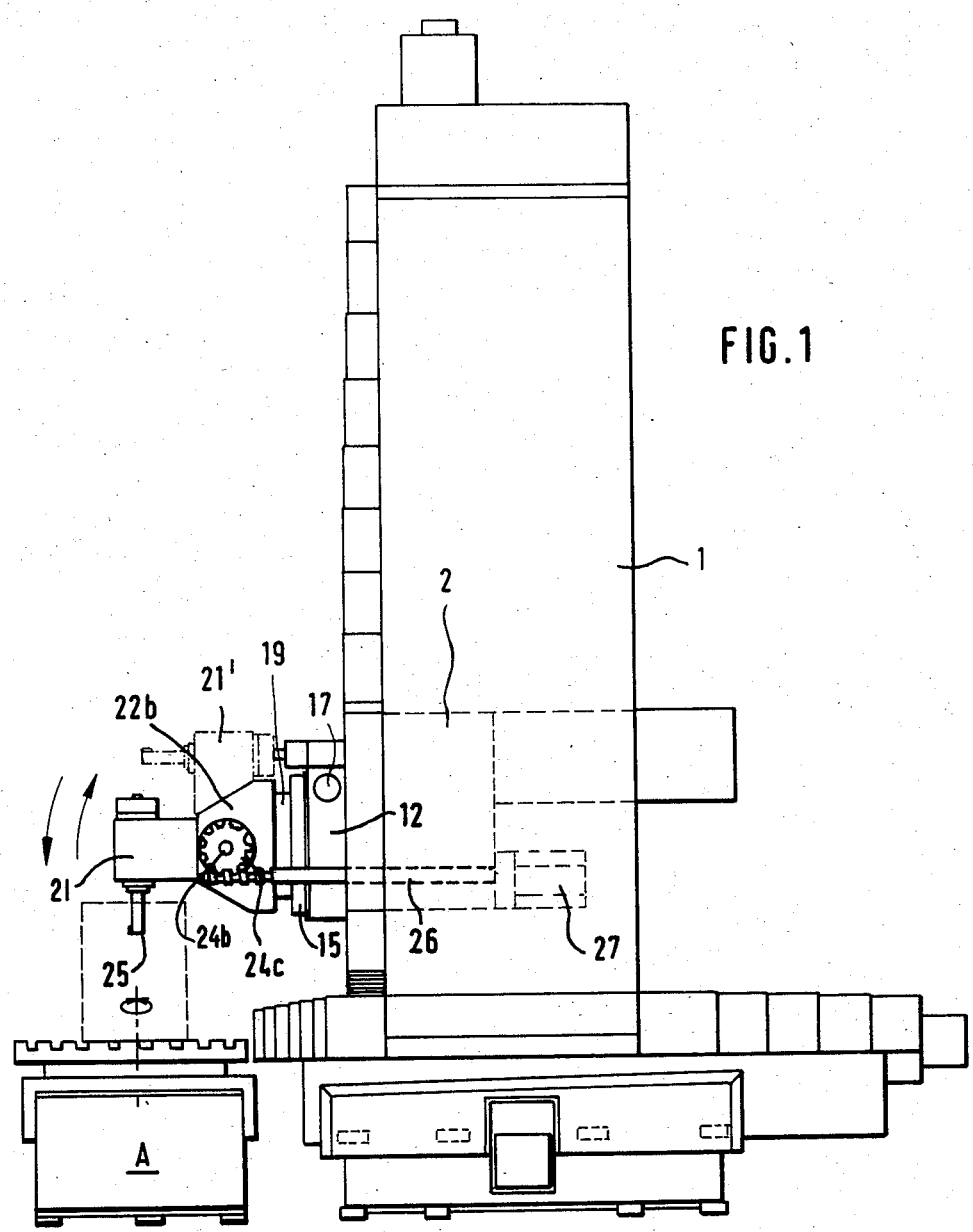
FIG. 1 is a side view of one embodiment of the milling machine of the present invention.

The holder 20 for an angle-cutting milling head 21 is connected with the collar-like attachment 15b of the partial disk 15 via a bayonet ring 19, and hence is rigidly connected with the partial disk. The front portion of the holder 20 is forked, being provided with two parallel jaws 22a, 22b. The sleeve-like portion 23 of the milling head 21 is provided with two lateral journal pins 24a, 24b which are supported in the two jaws 22a, 22b of the forked part of the holder 20. One of the two journal pins in FIG. 1 the pin 24b, carries on that end thereof which projects from the corresponding jaw (in FIG. 1 the jaw 22b) a pinion 24c that can be driven by a worm shaft 26 of the motor 27 on the headstock 2, which motor is shown in dashed lines in FIG. 1. When the motor 27 is actuated, the angle-cutting milling head 21 is pivoted via the shaft 26 and the pinion 24c out of the position illustrated in solid lines in FIGS. 1 and 3 into the position 21', which is illustrated in dot-dash lines. This pivoting always is effected in a vertical plane in such a way that the tool 25, which is inserted in the milling head 21, arrives at the position 9 (FIG. 2). In this position, the tool 25 can be grasped by the two-armed lever 4 and can be exchanged for a new tool from the storage 3. For this purpose, the ring 12 is provided with an attachment 28 that carries a tool ejector 29 which in the position 21' of the angle-cutting milling head effects an axial ejection of the tool 25 out of the milling head 21 into the grasping position of the changing arm 4. In the two extreme positions, the milling head 21, if necessary allowing for limit stops and limit switches, is held by releasable spring elements which can be released hydraulically in a known manner.

The milling spindle 32, in which the tool 25 is inserted, is driven by means of a bevel gearing 30, 31.

To drive the sleeve 33 and the shaft 34 of the milling head 21 connected therewith, the drilling spindle 10 is shifted in the direction of its axis M, so that with the drilling spindle retracted, a pivoting of the milling head 21 into its position 21' and back again is possible. Between the adjacent end faces of the sleeve 33 and the drilling spindle 10 appropriate means are provided for allowing the end faces of the two parts to intermesh, for example appropriate coupling parts 35.

Figure 4:
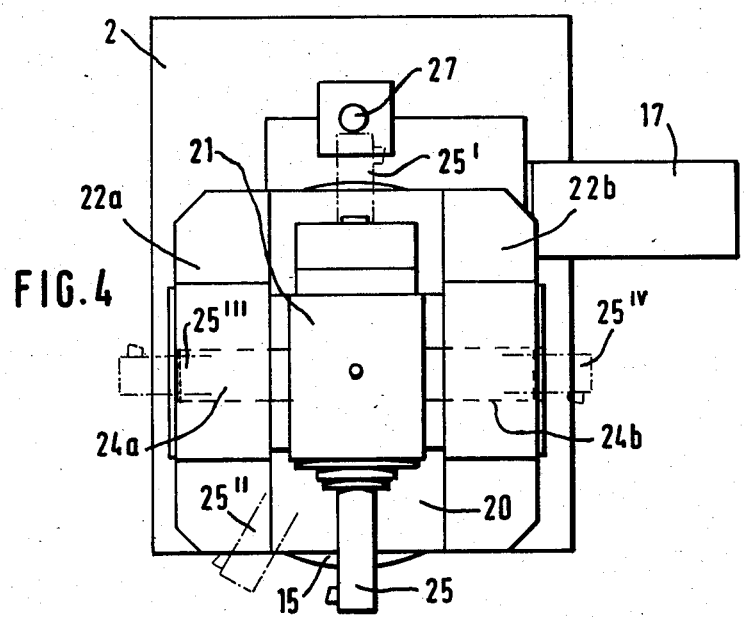
FIG. 4 is a front view of the headstock showing the possible rotated positions of the milling head, without the motor which effects the pivotable movement of the milling head.

As shown in FIG. 4, the angle-cutting milling head 21 with the tool 25 can be placed in various angular positions along a circle. Therefore, the tool 25, in addition to the positions 25 and 25', also can achieve for example the positions 25'', 25''', and 25$^{IV}$. To change the tool, the milling head 21 is rotated about the axis M (FIG. 3) in such a way that the tool is pivoted upwardly out of the position 25 into the position 25'. If the milling head is disposed in the position 25 of its tool, the milling head can be pivoted directly into its tool changing position. If the milling head is disposed in other positions, the milling head is first rotated with the aid of the partial disk 15 into the aforementioned starting position, whereupon the pivoting up, i.e. the movement indirectly out of the working position into the changing position, is effected.

Figure 5:
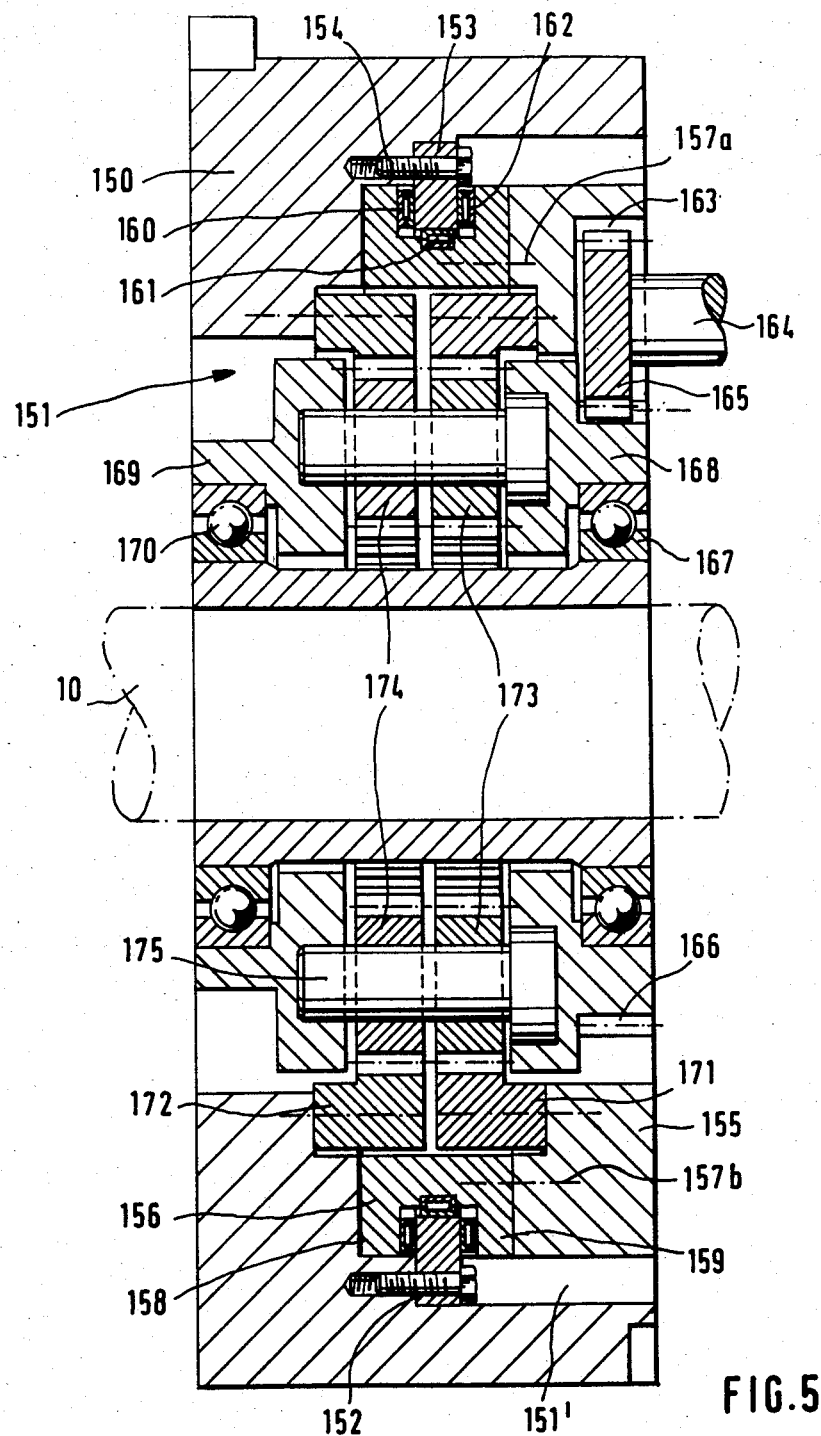
FIG. 5 shows a particularly advantageous embodiment according to which the desired angular positions of the tool can be precisely set.

In the embodiment shown in FIG. 5, the partial disk 150 is driven by a planetary gearing 151 which is digitally controlled. For this purpose, the partial disk 150 is provided with a recess 151', with the wall 152 of which a raceway way 153 is connected by means of screws 154. A guide ring 156, which has a U-shaped cross section, is connected with the ring 155, which corresponds to the ring 12 of the embodiment of FIG. 3, and is connected with the headstock. To facilitate illustration, the screws utilized for this purpose are only designated by the lines 157a, 157b. Roller bearings 160, 161, 162 are provided between the guide ring 156, or its two arms 158, 159, and the raceway 153. These roller bearings, together with the raceway 153 and the ring 156, form an axial and radial bearing for the partial disk 150.

A pinion 165 extends into a recess 163 of the stationary ring 155. The pinion 165 is driven by a shaft 164, and meshes with the toothed rim 166 of a gearing ring 168, which is rotatable due to the bearing 167 and surrounds the spindle 10. Also associated therewith is a gearing ring 169 which is also rotatable via the bearing 170.

A toothed ring 171 is fastened rigidly with the ring 171, and a further toothed ring 172 is fastened rigidly with the partial disk 150. Separate planetary gears 173 mesh with the toothed rim of the toothed ring 171, and separate planetary gears 174 mesh with the toothed rim of the toothed ring 172. The planetary gears 173, 174 are interconnected rigidly in pairs by respective arbors 175. The rings 168, 171, 172, as well as the gears 173, 174 with their different gear ratios form the planetary gearing for the continuously precise drive of the partial disk 150.

The angle of application of the tool 25 on the workpiece is simple to establish in that it requires only the determining of the angle of rotation of the partial disk 15 or 150 in the vertical plane, and the turning of the workpiece on the round table or work table in the horizontal plane.

The tool ejector 29 is associated with headstock and is located between the latter and the milling head when the latter is in its tool exchanging position.

The present invention is, of course, in no way restricted to the specific disclosure of the specification and drawings, but encompasses any modifications within the scope of the appended claims.

What I claim is:

1. A horizontal drilling and milling machine having a work table with a workpiece thereon undergoing a rotation in a horizontal plane such that even the most difficult workpieces, without having to be reclamped and tilted, can be machined on five sides accurately at all angles of application of a tool including accurate drilling of bores via such tool being brought into horizontally respectively vertically inclined positioning, said machine comprising:

a vertically extending column;

a headstock movable up and down on said column;

a rotatable drive drilling spindle which is provided with means for operative connection thereof with said headstock and having a central longitudinal axis therewith;

an angle-cutting milling head provided with a milling spindle and a drive shaft, means coupling said shaft to be coaxially directly engaged and driven by said drilling spindle; said milling head being provided with means for rotary indexing thereof about said longitudinal axis of said drilling spindle for exact positioning of a tool in a working position thereof taking into consideration encountering of torque and reaction forces exerted between said headstock and said tool, and being further provided with means for said milling head to be pivoted into a tool exchanging position about an axis which extends at right angles to said longitudinal axis of said drilling spindle.

2. A drilling and milling machine according to claim 1, which includes a rotatable partial disk associated with said headstock, and a holder which is associated with said partial disk and serves to hold said milling head.

3. A drilling and milling machine according to claim 2, which includes, associated with said headstock, a motor for driving said partial disk.

4. A drilling and milling machine according to claim 2, in which said coupling means includes means by which said drilling spindle can be axially moved, is coaxial with said drive shaft of said milling head, and can be selectively coupled to and uncoupled from said drive shaft.

5. A drilling and milling machine according to claim 2, in which said pivoting means includes pins which extend at right angles to said longitudinal axis of said drilling spindle and are pivotably supported by said holder for the purpose of said pivoting of said milling head into said tool exchanging position; in which said headstock is provided with a motor which extends parallel to said drilling spindle; and in which one of said pins carries a pinion which is driven by said motor.

6. A drilling and milling machine according to claim 2, which includes a tool ejector which is associated with said headstock and is located between the latter and said milling head when the latter is in its tool exchanging position.

7. A drilling and milling machine according to claim 2, which includes a continuous tool storage disposed alongside said machine, said tool storage being provided with a tool changing arm, the length of which corresponds to the distance between said tool storage and said milling head when the latter is in its tool exchanging position.

8. A drilling and milling machine according to claim 2, which includes a digitally controlled planetary gearing associated between said headstock and said partial disk for driving the latter for setting any desired angular position of said milling head.

9. A horizontal drilling and milling machine having a work table with a workpiece thereon undergoing a rotation in a horizontal plane such that even the most difficult workpieces, without having to be reclamped and tilted, can be machined on five sides accurately at all angles of applications of a tool including accurate drilling of bores via such tool being brought into horizontally respectively vertically inclined positioning, said machine comprising:

a vertically extending column;

a headstock movable up and down on said column;

a rotatable drilling spindle which is provided with means for operative connection thereof with said headstock and having a central longitudinal axis therewith;

an angle-cutting milling head provided with a milling spindle and a drive shaft which is adapted to be driven directly and linearly by said drilling spindle; said milling head being provided with means for accurate indexing thereof to be rotatable about said longitudinal axis of said drilling spindle for exact positioning of a tool in a working position thereof taking into consideration encountering of torque and reaction forces exerted between said headstock and said tool, and being provided with means for said milling head to be pivoted accurately also into a tool exchanging position about an axis which extends at right angles to said longitudinal axis of said drilling spindle;

a rotatable partial disk associated with said headstock, and a holder which is connected releasably with said partial disk and serves to hold said milling head;

a digitally controlled planetary gearing associated with said headstock and said partial disk for driving the latter for setting any desired angular position of said milling head;

a tool ejector associated with said headstock and located between the latter and said milling head when the latter is moved pivotably into its tool exchanging position in which the tool is grasped by a tool-changing arm; and a continuous tool storage disposed alongside said machine, said tool storage being provided with said tool changing arm, the length of which corresponds to the distance between said tool storage and said milling head when the latter is in its tool exchanging position.

10. A drilling and milling machine according to claim 9, in which said drilling spindle can be axially moved, is coaxial with said drive shaft of said milling head, and can be selectively coupled to and uncoupled from said drive shaft that is longitudinally adjustable and said spindle in coupled position with said drive shaft projects into said holder.

11. A drilling and milling machine according to claim 9, in which a bayonet ring releasably connects said holder with said partial disk rotatably mounted on said headstock; said milling head being provided with pins which extend at right angles to said longitudinal axis of said drilling spindle and are pivotably supported by said holder for the purpose of said pivoting of said milling head into said tool exchanging position; said headstock being provided with a motor which extends parallel to said drilling spindle; and one of said pins carries a pinion which is driven by said motor.

12. A drilling and milling machine according to claim 9, which includes, associated with said headstock, a side motor for driving said partial disk, a gear ring via which said side motor drives said partial disk and a guide means for control of the position of said partial disk.

* * * * *